United States Patent [19]
Koyanagi et al.

[11] Patent Number: 4,833,487
[45] Date of Patent: May 23, 1989

[54] METHOD OF AND APPARATUS FOR RECORDING IMAGE ONTO A RECORDING MEDIUM WITHOUT SUBJECTING THE MEDIUM TO UNDESIRED EXTERNAL FORCES

[75] Inventors: Yoshihiro Koyanagi; Takashi Imamura; Gen Sasaki, all of Kanagawa, Japan

[73] Assignee: Fuji Photo Film Co., Ltd., Kanagawa, Japan

[21] Appl. No.: 128,555

[22] Filed: Dec. 3, 1987

[30] Foreign Application Priority Data

Dec. 3, 1986 [JP] Japan .................................. 61-288069
Sep. 7, 1987 [JP] Japan .................................. 62-224847

[51] Int. Cl.⁴ .......................... G01D 9/00; G01D 9/42; G01D 15/24
[52] U.S. Cl. ..................................... 346/1.1; 346/108; 346/134; 346/136
[58] Field of Search ............... 346/108, 160, 134, 136, 346/1.1

[56] References Cited
U.S. PATENT DOCUMENTS 4,107,700 8/1978 Jornod .................................. 346/136
4,307,408 12/1981 Kiyohara ............................ 346/108

Primary Examiner—E. A. Goldberg
Assistant Examiner—Mark Reinhart
Attorney, Agent, or Firm—Sughrue, Mion, Zinn, Macpeak & Seas

[57] ABSTRACT

An image is recorded on an elongate image recording medium by feeding the image recording medium in an auxiliary scanning direction from a loading unit and applying a light beam to the image recording medium in a main scanning direction transverse to the auxiliary scanning direction. A loose loop is formed out of the image recording medium between the loading unit and an image scanning recording unit. Guide plates are angularly displaced to allow the image recording medium to hang by gravity with the image recording medium with the image recorded thereon having a free distal end. The hanging image recording medium is moved back toward the image scanning recording unit after the image has been recorded. The guide plates are displaced back to deliver the image recording medium to a next process.

11 Claims, 5 Drawing Sheets

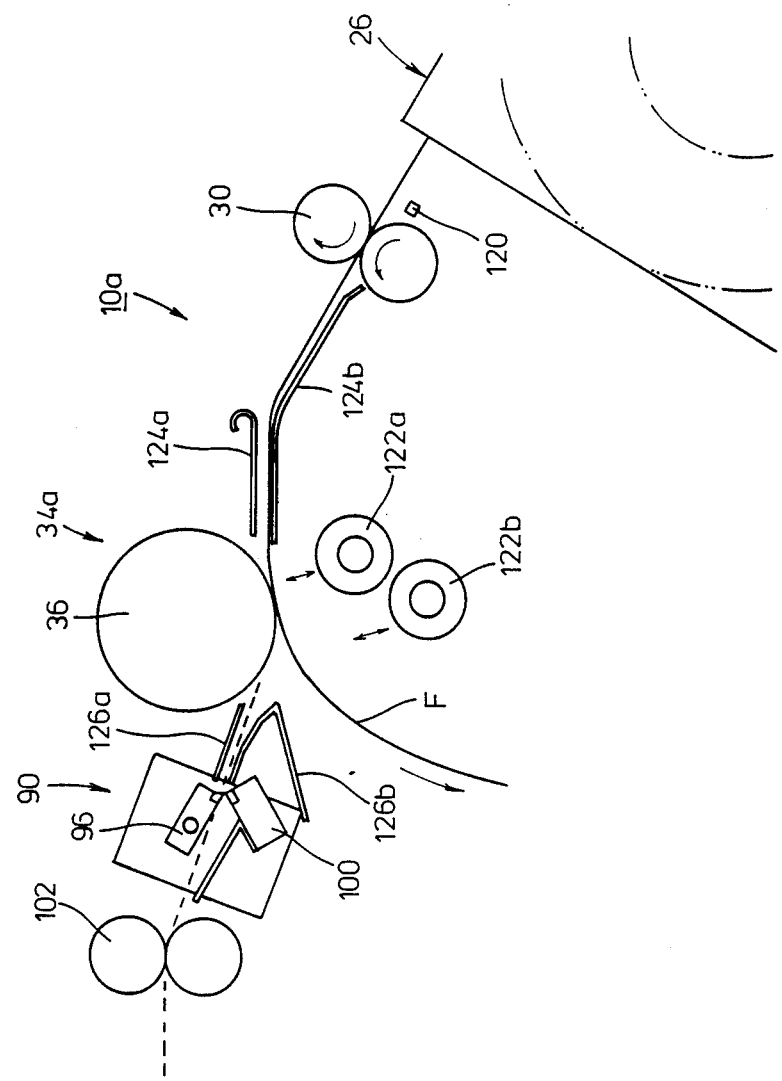

METHOD OF AND APPARATUS FOR RECORDING IMAGE ONTO A RECORDING MEDIUM WITHOUT SUBJECTING THE MEDIUM TO UNDESIRED EXTERNAL FORCES

BACKGROUND OF THE INVENTION

The present invention relates to a method of and apparatus for recording an image, and more particularly to a method of and apparatus for recording an image on an image recording carrier or medium by taking the image recording medium such as an elongate photographic photosensitive material from a magazine, and gripping and transferring the image recording medium with a drum and nip rollers for exposure of the image recording medium to the image, while allowing the image recording medium to hang by gravity to prevent unwanted external forces from being applied to the image recording medium, for thereby permitting the image recording medium to be appropriately scanned for image recording and also for utilizing the image recording medium without wasting the same.

In printing and platemaking industries, image scanning reading/recording systems are widely used for reading and electrically processing image information on original documents to produce film plates with a view to simplifying the operation process and increasing the image quality.

Such an image scanning reading/recording system is basically constructed of an image reading device, a control device, and an image recording device. In the image reading device, a reflective photographic original or a linear image original is scanned by a light beam to detect an image with a photomultiplier or the like, or the image is read by a CCD (charge-coupled device), and the image information of the original is converted to an electric signal that is dependent on the magnitude of reflected light. Then, the image information which has been photoelectrically converted by the image reading device is subject to various processes such as for gradation correction, profile emphasis, and the like dependent on platemaking conditions in the control device. Thereafter, the image information thus processed is converted by the image recording device to a light signal represented by a laser beam, which is applied to an image recording carrier or medium of a photosensitive material such a photographic film to record the desired image thereon. The image recorded on the image recording medium is then developed and the developed image recording medium is used as a film plate for printing operation.

The image recording device for applying the laser beam to the film for recording the desired image is arranged as follows:

A magazine housing a roll of an elongate film is loaded in the image recording device. The film is then gripped by a pair of rollers, which are rotated to feed the film to an image scanning recording unit. In the image scanning recording unit, the film is fed in an auxiliary scanning direction by a rotating drum and a nip roller held in rolling contact therewith, while at the same time the film is scanned in a main scanning direction by the laser beam that has been modulated on the basis of the gradation correction effected in the control device, for recording the desired image on the film. Then, the film is automatically cut off to a desired length by a cutter in the image recording device, and delivered to an image developing device by a feed system (not shown).

The film must accurately and smoothly be fed in the auxiliary scanning direction in the image scanning recording unit. If the film being scanned by the laser beam were not smoothly fed in the auxiliary scanning direction due to application of external forces or the like, the applied laser beam would be shifted out of the desired position on the film. With such a positional deviation, an inaccurate image would be recorded on the film, and the resultant film could not be used as a film plate.

SUMMARY OF THE INVENTION

It is a general object of the present invention to provide a method of and apparatus for recording an image on an elongate image recording medium stored in a magazine by transferring the image recording medium with a pair of feed rollers to an image scanning recording unit, and allowing the image recording medium, before and after the image is recorded thereon, to hang by gravity in the image scanning recording unit to prevent unwanted external forces from being applied to the image recording medium while it is being scanned for image recording, for thereby accurately recording the desired image on the image recording medium.

A major object of the present invention is to provide a method of recording an image on an elongate image recording medium by feeding the image recording medium in an auxiliary scanning direction from a loading unit and applying a light beam to the image recording medium in a main scanning direction transverse to the auxiliary scanning direction, the method comprising the steps of: forming a loop out of the image recording medium between the loading unit and an image scanning recording unit; displacing guide means to allow the image recording medium to hang by gravity with a leading end of the image recording medium with the image recorded thereon being a free end; returning the hanging image recording medium toward the image scanning recording unit after the image has been recorded; and displacing the guide means to deliver the image recording medium to a next process.

Another object of the present invention is to provide a method of recording an image on an elongate image recording medium, wherein the image is recorded on the image recording medium while the image recording medium is hanging by gravity.

Still another object of the present invention is to provide a method of recording an image on an elongate image recording medium by feeding the image recording medium in an auxiliary scanning direction from a loading unit and applying a light beam to the image recording medium in a main scanning direction transverse to the auxiliary scanning direction, the method comprising the steps of: driving feed means disposed between the loading unit and auxiliary scanning feed means to feed the image recording medium stored in the loading unit by at least a length required for image recording and to allow the image recording medium to hang by gravity; driving the auxiliary scanning feed means to feed the image recording medium in the auxiliary scanning direction toward the feed means after the feed means has been inactivated, while applying the light beam to the image recording medium in the main scanning direction; and driving the auxiliary scanning feed means and/or the feed means to feed the image recording medium to a next process.

A still further object of the present invention is to provide a method of recording an image on an elongate image recording medium, wherein the auxiliary scanning feed means comprises a driving drum and first and second nip rollers normally held in rolling contact with the driving drum and movable toward and away from the driving drum, wherein after the first and second nip rollers have been moved away from the driving drum, the feed means is acutated to feed the image recording medium by at least the length between the driving drum and the first and second nip rollers and to allow the image recording medium to hang by gravity, and wherein the image recording medium is gripped between the first and second nip rollers and the driving drum and fed in the auxiliary scanning direction toward the feed means, while the light beam is being applied in the main scanning direction to the image recording medium from between the first and second nip rollers.

A yet still further object of the present invention is to provide a method of recording an image on an elongate image recording medium, wherein when the first and second nip rollers are moved away from the driving drum, the second nip roller is positioned downwardly of the first nip roller which is located more closely to the feed means.

A further object of the present invention is to provide an apparatus for recording an image on an elongate image recording medium, comprising: a first feed system for feeding the image recording medium from a loading unit in an auxiliary scanning direction; an image scanning recording unit for applying a light beam to the image recording medium fed by the first feed system in a main scanning direction transverse to the auxiliary scanning direction to record an image on the image recording medium; guide means for selecting a feed path for the image recording medium with the image recorded thereon by the image scanning recording unit; and a second feed system for feeding the image recording medium to a next process, the arrangement being such that a loop is formed out of the image recording medium between the loading unit and the image scanning recording unit when recording the image on the image recording medium.

A yet further object of the present invention is to provide an apparatus for recording an image on an elongate image recording medium, wherein the image scanning recording unit comprises an auxiliary scanning feed mechanism including a large-diameter drum and nip rollers movable into and out of rolling contact with the drum for gripping and feeding the image recording medium, and a laser beam applicator mechanism for applying a laser beam to the image recording medium.

Yet another object of the present invention is to provide an apparatus for recording an image on an elongate image recording medium, wherein the first feed system and the drum and the nip rollers are rotatable in a reverse direction for forming the loop out of the image recording medium.

Yet still another object of the present invention is to provide an apparatus for recording an image on an elongate image recording medium, wherein the guide means comprises a movable guide member with its distal end facing the drum and a drive source for actuating the movable guide member.

It is also an object of the present invention to provide an apparatus for recording an image on an elongate image recording medium, wherein the movable guide member comprises a first guide plate and a second guide plate which have respective distal ends held against each other, the drive source engaging the first guide plate, the drive source being actuatable to cause the first guide plate to displace the second guide plate.

Another object of the present invention is to provide an apparatus for recording an image on an elongate image recording medium, further including a resilient member coupled to the second guide plate near the distal end thereof for normally urging the distal end of the second guide plate toward the first guide plate.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4a and 4b are fragmentary schematic views of an image recording apparatus for carrying out a method according to another embodiment of the present invention.

DETAILED DESCRIPTION OF THE PREFERRED EMBODIMENTS

Figure 1:
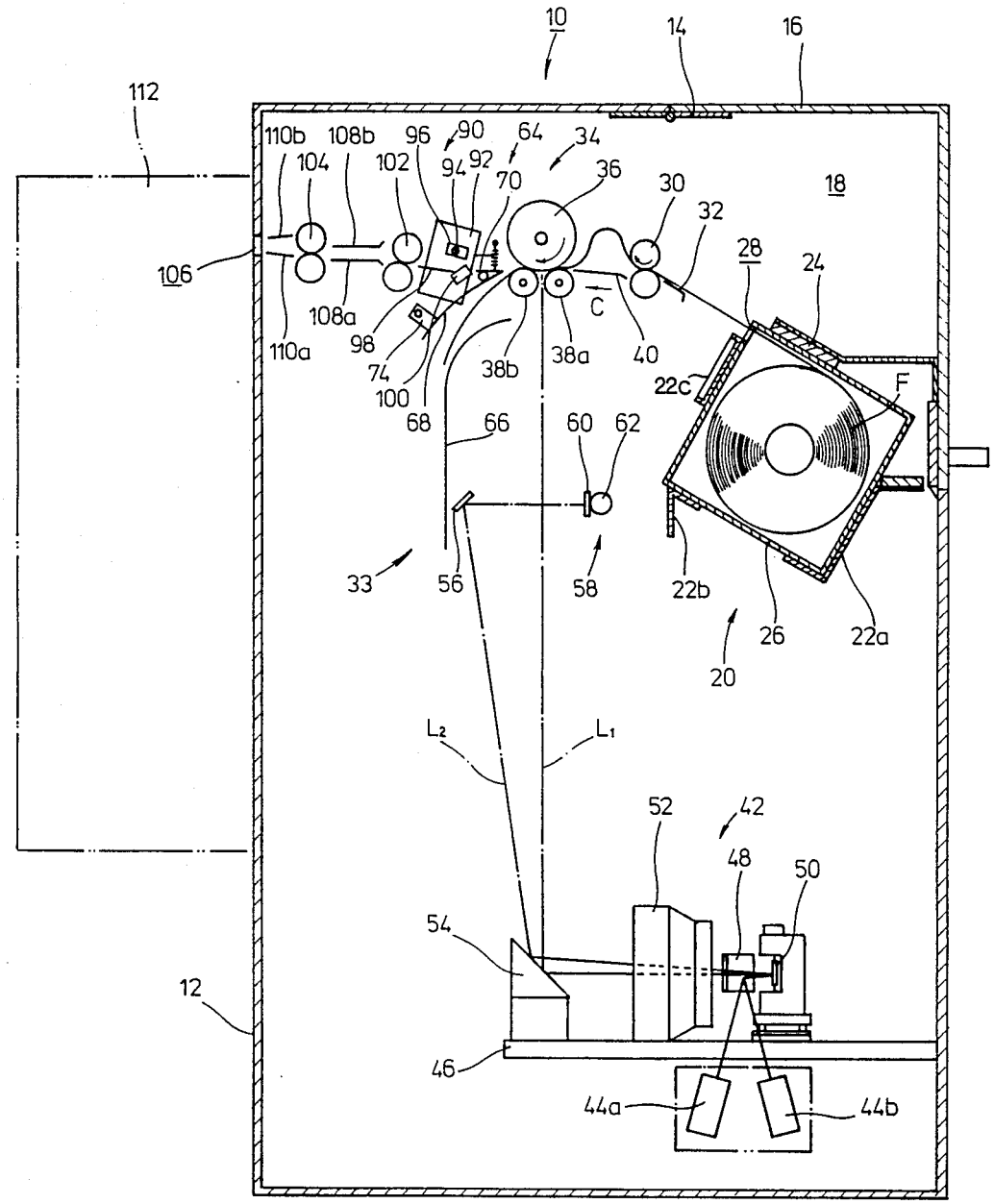
FIG. 1 is a schematic view of an image recording apparatus for carrying out an image recording method according to the present invention.

FIG. 1 shows an image recording apparatus 10 for carrying out an image recording method according to the present invention. The image recording apparatus 10 is shown as being separate from an image reading apparatus and a control apparatus, both not shown. However, the image recording apparatus 10 may be incorporated in an image scanning reading/recording system in which the image recording apparatus 10 is combined with an image reading apparatus and a control apparatus.

The image recording apparatus 10 includes a housing 12 on which an upper righthand bent cover 16 is openably and closably mounted by a hinge 14. The image recording apparatus 10 has a chamber 18 defined therein which houses a magazine loading unit 20 including a plurality of support bases 22a through 22c disposed in the chamber 18 and a presser 24 fixed to the cover 16. Therefore, when the cover 16 is opened, a magazine 26 stored in the magazine unit 20 can be unloaded therefrom.

A roll of an elongate unexposed film F is stored in the magazine 26. The end of the film F which is pulled out of a film slot 28 in the magazine 26 is gripped by a first roller pair 30 disposed in the chamber 18. A guide member 32 for guiding the film F is disposed between the first roller pair 30 and the magazine 26.

An image scanning recording unit 33 includes an auxiliary scanning feed mechanism 34 disposed in the vicinity of the first roller pair 30. The auxiliary scanning feed mechanism 34 basically includes a large-diameter rotatable driving drum 36 and two nip rollers 38a, 38b held in rolling contact with the drum 36 under the bias of a resilient member (not shown). The nip rollers 38a, 38b are movable toward and away from the drum 36. A guide plate 40 is disposed between the nip roller 38a and the first roller pair 30.

The image scanning recording unit 33 also includes a laser beam applicator mechanism 42 positioned below the auxiliary scanning feed mechanism 34. The laser beam applicator mechanism 42 includes laser beam sources 44a, 44b for respectively emitting a recording laser beam L1 and a laser beam L2 for a synchronizing signal generating circuit. The laser beam sources 44a, 44b are mounted on a surface plate 46 fixed to the housing 12. The laser beam L1 emitted from the laser beam source 44a is reflected by a mirror 48 for scanning the film F with the laser beam 44a, a light deflector 54 such as a galvanometer mirror, passed through a scanning lens 52 such as an fθ lens, and reflected by a mirror 54. The laser beam L2 emitted from the laser beam source 44b is also reflected by the mirror 48, the galvanometer mirror 50, passed through the scanning lens 52, and reflected by the mirror 54 and a mirror 56 to enter a laser beam position detector 58. The laser beam position detector 58 includes a grid 60 having a slit (not shown) defined therein and an encoder 62 for detecting the laser beam L2 that has passed through the grid 60.

Figure 2:
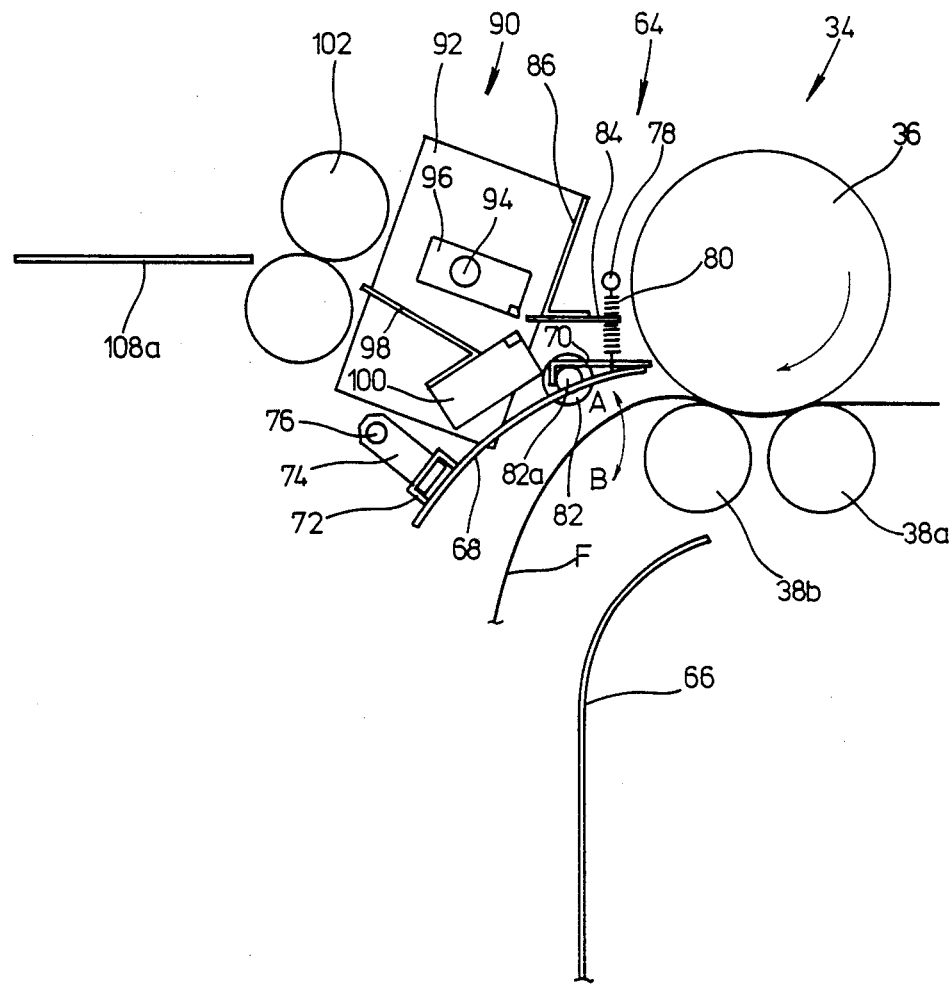
FIG. 2 is a fragmentary schematic view of the image recording apparatus shown in FIG. 1.

A guide assembly 64 is disposed near the auxiliary scanning feed mechanism 34. As shown in FIG. 2, the guide assembly 64 includes a relatively elongate guide plate 66 directed vertically downwardly and including a curved portion. Above the guide plate 66, there are disposed movable guide plates 68, 70 having respective ends held against each other. A bracket 72 is attached to the other end of the guide plate 68 and engages one end of a connector 74. The other end of the connector 74 is angularly movably supported on a pin 76. A coil spring 80 suspended from a pin 78 is connected to the guide plate 68 near its end engaging the guide plate 70.

The other end of the guide plate 70 engages a drive shaft 82a of a rotative drive source 82. When the rotative drive source 82 is energized, the drive shaft 82a is rotated to turn the guide plate 70 in the direction of the arrow A or B. As the guide plate 70 is thus turned, the guide plate 68 is turned about the pin 76 in the direction of the arrow A or B.

A short guide plate 84 is positioned upwardly of the guide plate 70. A cutter 90 includes a plate 92 mounted on the guide plate 84 by an angle 86 attached thereto. The cutter 90 also includes a first cutter blade 96 swingably mounted on the plate 92 by a shaft 94, and a second cutter blade 100 fixedly mounted on a bent guide plate 98 disposed below the first cutter blade 96. A second roller pair 102 and a third roller pair 104 (FIG. 1) spaced therefrom are disposed near the guide plate 98. Guide plates 108a, 108b lie between the second and third roller pairs 102, 104, and guide plates 110a, 110b lie between the third roller pair 104 and a film outlet 106 defined in the housing 12.

An image developing device 112 is connected to the image recording apparatus 10. The film F is delivered from the image recording apparatus 10 through the film outlet 106 into the image developing device 112 in which the image on the film F is developed. Although the movable guide plates 68, 70 are shown as being separate from each other, they may be of a unitary structure.

The image recording apparatus for carrying out an image recording method according to the present invention will operate as follows:

First, the cover 16 is swung open about the hinge 14, and the magazine 26 is stored in the magazine loading unit 20. The end of the rolled elongate film F stored in the magazine 26 is pulled out of the film slot 28 and gripped by the first roller pair 30.

Then, the cover 16 is closed and the image recording apparatus 10 is energized to rotate the first roller pair 30 to feed the film F toward the auxiliary scanning feed mechanism 34. The nip rollers 38a, 38b are displaced away from the drum 36 to allow the film F from the first roller pair 30 to enter between the nip rollers 38a, 38b and the drum 36. The nip rollers 38a, 38b are then shifted toward the drum 36 to grip the film F between themselves and the drum 36. The first roller pair 30 is further rotated to feed the film F a prescribed length into the auxiliary scanning feed mechanism 34 for making a loose loop out of the film F, as shown in FIG. 1. Thereafter, the drum 36 is rotated about its own axis in the direction of the arrow to feed the film F in an auxiliary scanning direction indicated by the arrow C.

The laser beam applicator mechanism 42 is now energized. The laser beams L1, L2 are emitted from the respective laser beam sources 44a, 44b and reflected by the mirror 48 toward the galvanometer mirror 50, which is angularly moved to deflect the laser beams L1, L2. The laser beam L1 is passed through the scanning lens 52 and reflected by the mirror 54 so as to be applied to the film F from between the nip rollers 38a, 38b. The other laser beam L2 is also passed through the scanning lens 52 and reflected by the mirror 54 and then by the mirror 56 to reach the encoder 62 through the grid 60, whereupon the encoder 62 detects that the laser beam L1 applied to the film F has reached a desired position.

The film F is thus scanned in a main scanning direction (transverse to the auxiliary scanning direction) by the laser beam L1, and at the same time, the film F is fed in the auxiliary scanning direction by the drum 36 and the nip rollers 38a, 38b held in rolling contact therewith. As a result, the film F is two-dimensionally scanned by the laser beam L1 to record a desired image thereon.

As illustrated in FIG. 1, a loop is formed out of the film F between the first roller pair 30 and the auxiliary scanning feed mechanism 34. As shown in FIG. 2, the guide plates 68, 70 are turned in the direction of the arrow A. More specifically, the rotative drive source 82 is driven to cause the drive shaft 82a to turn the guide plate 70 in the direction of the arrow A. The guide plate 68 is now turned in the direction of the arrow A about the pin 76 under the tension of the coil spring 80. Thus, the leading end of the film F on which the image has been recorded is permitted to hang by gravity along the guide plate 66. With the leading end of the film F being thus in a free state, the film F is not subject to any unwanted external forces which would otherwise be applied due to tension or the like arising from a variation in the speed of feed by the first roller pair 30 and the like. The film F is smoothly fed in the auxiliary scanning direction by being gripped between the drum 36 and the nip rollers 38a, 38b, while the image is being accurately recorded on the film F by the image scanning recording unit 33.

After the desired image has been recorded on the film F by the image scanning recording unit 33, the drum 36 and the first roller pair 30 are rotated in a direction opposite to the direction in which they were rotated to feed the film F, for thereby moving back the leading end of the film F a prescribed distance toward the drum 36. The film F is returned for the reasons of cutting off the film F to a certain length and delivering the film F to a next process.

After the leading end of the film F has been gripped between the drum 36 and the nip roller 38b, the guide plates 68, 70 are turned in the direction of the arrow B.

Figure 3:
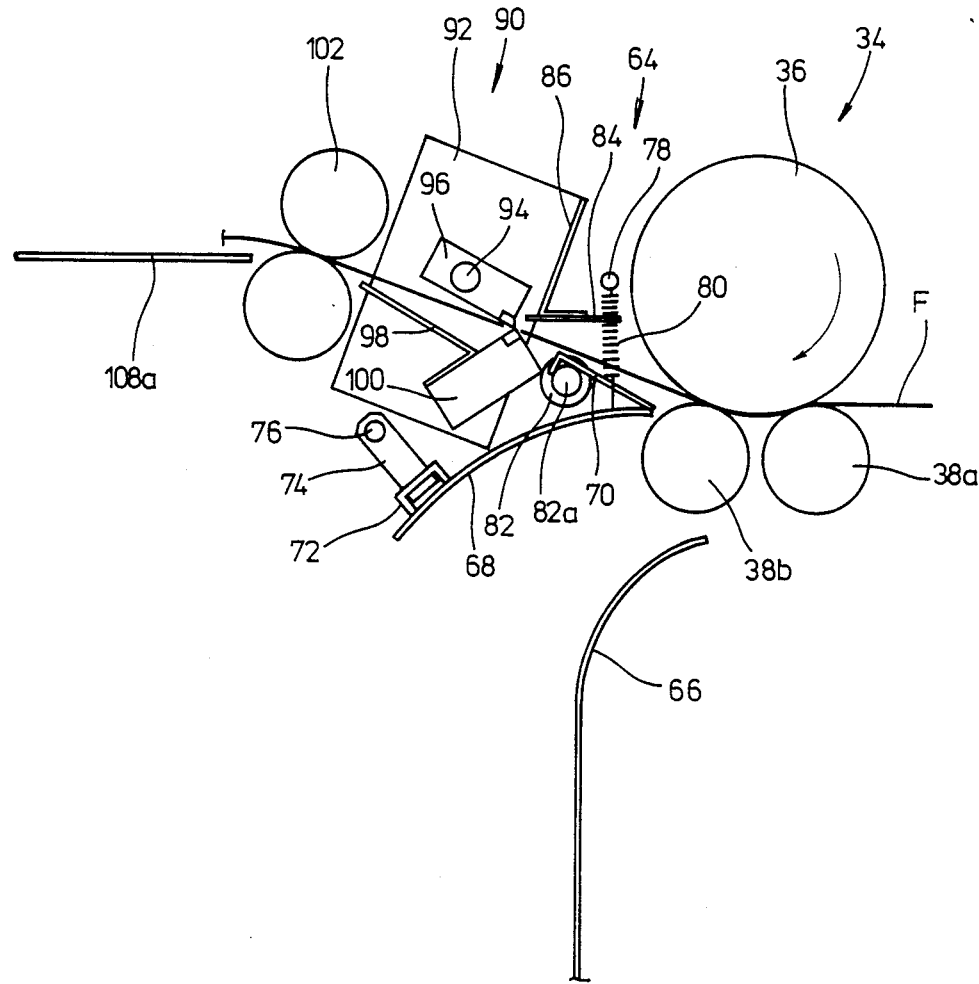
FIG. 3 is a view similar to FIG. 2, showing operation of the image recording apparatus.

More specifically, the rotative drive source 82 is energized to enable the drive shaft 82a to swing the guide plate 70 in the direction of the arrow B. When the guide plate 70 is turned, the end of the guide plate 68 is pressed by the guide plate 70 to displace the guide plate 68 against the tension of the coil spring 80. The guide plate 68 is therefore turned about the pin 76 in the direction of the arrow B (see FIG. 3).

Then, the drum 36 and the first roller pair 30 are rotated again in the direction of the arrow. As a result, the leading end of the film F is passed between the guide plates 70, 84, gripped by the second roller pair 102, and passed between the guide plates 108a, 108b, and then delivered from the third roller pair 104 to the film outlet 106. While the film F is being thus fed along, the elongate film F is cut off to a desired length by the cutter 90. The movable first cutter blade 96 is rotated about the shaft 94 to coact with the fixed second cutter blade 100 in severing the film F (see FIG. 3).

The film F thus severed is delivered from the film outlet 106 into the image developing device 112, in which the image on the film F is developed. Thereafter, the film F can be used as a film plate for a variety of applications.

Figure 4B:
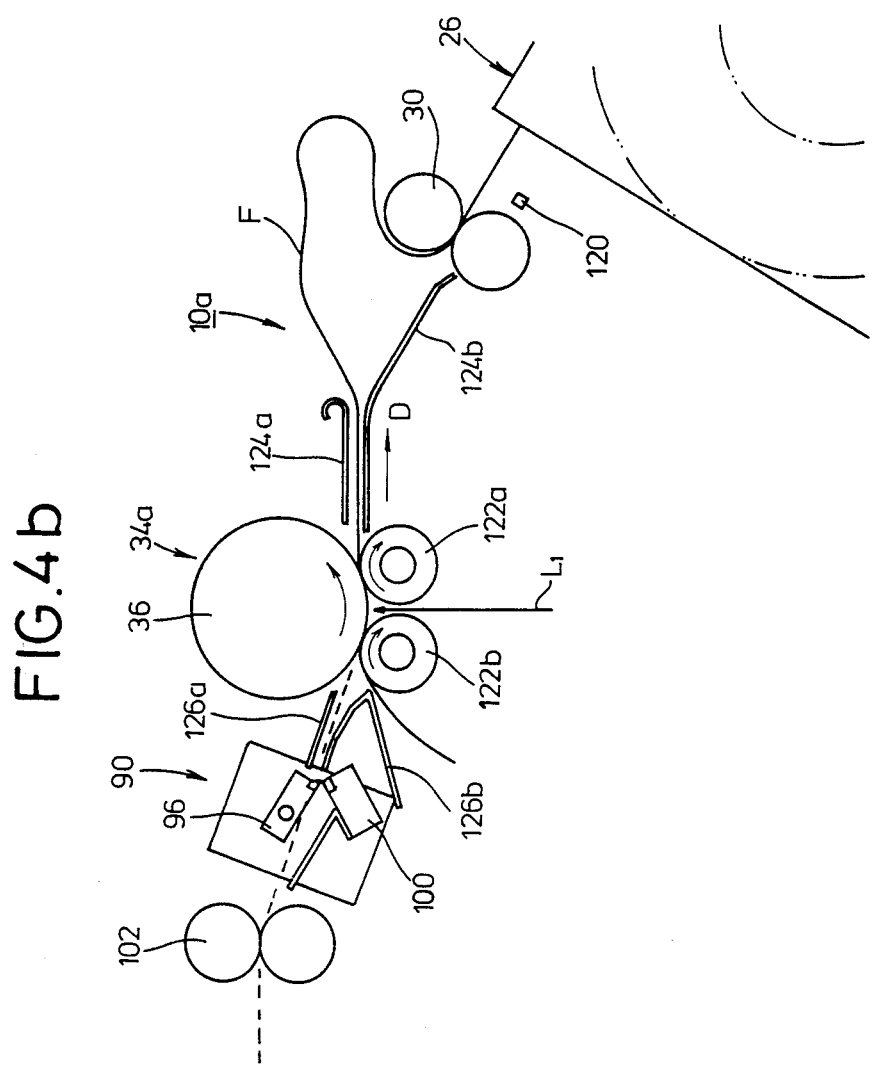

An image recording method according to another embodiment of the present invention will be described below. The image recording method of the other embodiment may be carried out by the image recording apparatus 10 shown in FIG. 1. However, to simplify the arrangement of the apparatus and allow the image recording method to be effected smoothly, another image recording apparatus 10a shown in FIGS. 4a and 4b is employed to carry out the method of the other embodiment. Those reference numerals in FIGS. 4a and 4b which are identical to those of FIGS. 1 through 3 denote identical parts.

As shown in FIGS. 4a and 4b, the image recording apparatus 10a includes a sensor 120 disposed between the first roller pair 30 and the magazine 26 for detecting that the film F has been fed a predetermined length. An auxiliary scanning feed mechanism 34a disposed closely to the first roller pair 30 includes two nip rollers 102a, 102b normally biased by a resilient member (not shown) to be held in rolling contact with the large-diameter drum 36. The nip rollers 102a, 102b are movable toward and away from the drum 36 in the directions of the arrows. The nip roller 122b is movable away from the drum 36 a greater distance than the nip roller 122a is movable away from the drum 36. A shorter guide plate 124a and a longer guide plate 124b are disposed in vertically confronting relation between the auxiliary scanning feed mechanism 34a and the first roller pair 30. A pair of guide plates 126a, 126b is positioned in the path along which the film F can be fed by the drum 36 and the nip rollers 122a, 122b.

For recording an image on the film F in the image recording apparatus 10a, the end of the film F contained in the magazine 26 is pulled out and gripped by the first roller pair 30. As shown in FIG. 4a, the nip rollers 122a, 122b are spaced from the drum 36, with the nip roller 122b being located downwardly of the nip roller 122a.

Then, the first roller pair 30 is rotated to feed the film F, as it is guided by the guide plates 124a, 124b, toward the auxiliary scanning feed mechanism 34a. The film F enters between the drum 36 and the nip rollers 122a, 122b and hangs downwardly by gravity, as shown in FIG. 4a. When the sensor 120 detects that the film F has been taken out of the magazine 26 by a given length required for one image recording cycle, the first roller pair 30 stops its rotation. Since the nip roller 122b is positioned below the nip roller 122a, the leading end of the film F as it hangs by gravity can easily be inserted between the nip roller 122b and the drum 36.

The nip rollers 122a, 122b are then displaced upwardly toward the drum 36 as indicated by the arrows to grip the film F between the nip rollers 122a, 122b and the drum 36. The drum 36 is rotated in the opposite direction indicated by the arrow (FIG. 4b) toward the magazine 26 for feeding the film F at a constant speed in an auxiliary scanning direction (indicated by the arrow D).

The laser beam applicator mechanism 42 (FIG. 1) is energized to record a desired image on the film F. When the film F is fed in the direction of the arrow D by the drum 36 and the nip rollers 122a, 122b, a loose loop is made out of the film F between auxiliary scanning feed mechanism 34a and the first roller pair 30. At the time the leading end of the film F is gripped between the nip roller 122b and the drum 36, the drum 36 is inactivated. Then, the drum 36 is reversed to feed the film F in a direction opposite to the direction of the arrow D. The film F is guided by the guide plates 126a, 126b and then delivered by the roller pair 102 toward the film outlet 106 (FIG. 1), during which time the film F is cut off to a desired length by the cutter 90.

According to the embodiment shown in FIGS. 4a and 4b, no unwanted external forces are applied to the film F and hence an image can accurately be recorded on the film F. The film F is prevented from being skewed or bent or otherwise made tortuous in the auxiliary scanning feed mechanism 34a. More specifically, inasmuch as the film F is fed out of the magazine 26 by a length required for one image recording cycle, the film F as it is fed in the auxiliary scanning direction is not skewed or made tortuous regardless of the condition in which the film F is rolled in the magazine 26 or by a loop or curl of the film F which would otherwise be present. Film F feed failures can effectively be prevented, and the image recording process can be effected with accuracy.

With the present invention, as described above, the image recording carrier or medium such as film stored in the magazine is fed in the auxiliary scanning direction through the roller pair by the auxiliary scanning feed mechanism of the image scanning recording unit. While a desired image is being recorded on the image recording medium by the laser beam applicator mechanism of the image scanning recording unit, unwanted external forces which would otherwise be imposed on the image recording medium due to a variation in the speed of feed by the roller pair are prevented from being generated, so that a desired image can be recorded on the image recording medium in the image scanning recording unit. The movable guide plate toward which the image recording medium can be fed by the auxiliary scanning feed mechanism is turned to allow the image recording medium with the image recorded thereon to hang by gravity. After the image has been recorded, the drum and the roller pair of the auxiliary scanning feed mechanism are reversed to move back the image recording medium toward the magazine until the leading end of the image recording medium is gripped again in the auxiliary scanning feed mechanism. The movable guide plate is swung to select the path for guiding the image recording medium to a next process, after which the drum and the roller pair are rotated again in the normal direction to deliver the image recording medium with the image recorded to the next process. Therefore, no unwanted external forces are applied to the image recording medium when the image is recorded thereon, so that the image can accurately and reliably be recorded on the image recording medium. Since the image can be recorded on the image recording medium continuously from its leading end, the image recording medium can be utilized without wasting it.

According to the present invention, moreover, the image recording medium rolled in the magazine is fed out toward the image scanning recording unit through the roller pair by a length required for one image recording cycle, and then is gripped by the drum and the nip rollers and fed thereby in the auxiliary scanning direction, while at the same time the recording laser beam is applied to the image recording medium in the main scanning direction normal to the auxiliary scanning direction for thereby recording the image on the image recording medium. Even if the image recording medium is curled, the image recording medium is not skewed or made tortuous during the recording of the image, and no feed failures result. Therefore, the image recording process can efficiently be performed. Before the image recording medium is scanned for image recording, the image recording medium is fed out of the magazine for a required length. While the image recording medium is being scanned, the feed roller pair is inactivated. As a consequence, unwanted external forces due for example to vibration are not applied to the image recording medium being fed in the auxiliary scanning direction, and accurate images of high quality can be produced on the film.

Although certain preferred embodiments have been shown and described, it should be understood that many changes and modifications may be made therein without departing from the scope of the appended claims.

What is claimed is:

1. A method of recording an image on an elongate image recording medium by feeding the image recording medium in an auxiliary scanning direction from a loading unit and applying a light beam to the image recording medium in a main scanning direction transverse to the auxiliary scanning direction, said method comprising the steps of: forming a loop out of the image recording medium between said loading unit and an image scanning recording unit; displacing guide means to allow the image recording medium to move to a first position where it hangs by gravity with a leading end of the image recording medium with the image recorded thereon being a free end; returning the hanging image recording medium toward said image scanning recording unit after the image has been recorded; and displacing said guide means to deliver the image recording medium to a second position different from said first position.

2. A method according to claim 1, wherein the image is recorded on the image recording medium while the image recording medium is hanging by gravity.

3. A method of recording an image on an elongate image recording medium by feeding the image recording medium in an auxiliary scanning direction from a loading unit and applying a light beam to the image recording medium in a main scanning direction transverse to the auxiliary scanning direction, said method comprising the steps of: driving a feed means disposed between said loading unit and an auxiliary scanning feed means to feed the image recording medium stored in the loading unit by at least a length required for image recording and to allow the image recording medium to pass to a first position where it hangs by gravity; driving said auxiliary scanning feed means to feed the image recording medium in the auxiliary scanning direction toward said feed means after said feed means has been inactivated, while applying the light beam to the image recording medium in the main scanning direction; and driving at least one of said auxiliary scanning feed means and said feed means to feed the image recording medium to a second position different from said first position.

4. A method according to claim 3, wherein said auxiliary scanning feed means comprises a driving drum and first and second nip rollers normally held in rolling contact with said driving drum and movable toward and away from said driving drum, wherein after said first and second nip rollers have been moved away from said driving drum, said feed means is actuated to feed the image recording medium by at least said length between said driving drum and said first and second nip rollers and to allow the image recording medium to hang by gravity, and wherein the image recording medium is gripped between said first and second nip rollers and said driving drum and fed in said auxiliary scanning direction toward said feed means, while the light beam is being applied in said main scanning direction to the image recording medium from between said first and second nip rollers.

5. A method according to claim 4, wherein when said first and second nip rollers are moved away from said driving drum, said second nip roller is positioned downwardly of said first nip roller which is located more closely to said feed means.

6. An apparatus for recording an image on an elongate image recording medium, comprising: a loading unit; an image scanning recording unit; a first feed system for feeding the image recording medium from said loading unit in an auxiliary scanning direction to said image scanning recording unit; said image scanning recording unit being provided for applying a light beam to the image recording medium fed by said first feed system in a main scanning direction transverse to said auxiliary scanning direction to record an image on the image recording medium; guide means for selecting a feed path for the image recording medium with the image recorded thereon by said image scanning recording unit; and a second feed system for feeding the image recording medium along a feed path selected by said guide means, the arrangement being such that a loop is formed by the image recording medium between said loading unit and said image scanning recording unit when recording the image on the image recording medium.

7. An apparatus according to claim 6, wherein said image scanning recording unit comprises an auxiliary scanning feed mechanism including a large-diameter drum and nip rollers movable into and out of rolling contact with said drum for gripping and feeding the image recording medium, and a laser beam applicator mechanism for applying a laser beam to the image recording medium.

8. An apparatus according to claim 7, wherein said first feed system and said drum and said nip rollers are rotatable in a reverse direction for forming said loop out of said image recording medium.

9. An apparatus according to claim 7, wherein said guide means comprises a movable guide member with its distal end facing said drum and a drive source for actuating said movable guide member.

10. An apparatus according to claim 9, wherein said movable guide member comprises a first guide plate and a second guide plate which have respective distal ends held against each other, said drive source engaging said first guide plate, said drive source being actuatable to cause said first guide plate to displace said second guide plate.

11. An apparatus according to claim 10, further including a resilient member coupled to said second guide plate near the distal end thereof for normally urging the distal end of said second guide plate toward said first guide plate.

* * * * *